United States Patent
Fujii

(10) Patent No.: US 11,446,970 B2
(45) Date of Patent: Sep. 20, 2022

(54) RECEIVER AND TRANSMITTER UNIT FOR TIRE CONDITION MONITORING APPARATUS

(71) Applicant: PACIFIC INDUSTRIAL CO., LTD., Ogaki (JP)

(72) Inventor: Keiyu Fujii, Ibi-gun (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 1131 days.

(21) Appl. No.: 15/778,081

(22) PCT Filed: Apr. 27, 2017

(86) PCT No.: PCT/JP2017/016767
§ 371 (c)(1),
(2) Date: May 22, 2018

(87) PCT Pub. No.: WO2018/198270
PCT Pub. Date: Nov. 1, 2018

(65) Prior Publication Data
US 2021/0178840 A1    Jun. 17, 2021

(51) Int. Cl.
*B60C 23/04*    (2006.01)
*H01Q 1/22*    (2006.01)
(Continued)

(52) U.S. Cl.
CPC ...... *B60C 23/0415* (2013.01); *B60C 23/0416* (2013.01); *B60C 23/0433* (2013.01);
(Continued)

(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS 5,764,137 A    6/1998    Zarkhin
10,160,270 B2    12/2018    Araya
(Continued)

FOREIGN PATENT DOCUMENTS

CN    102252691 A    11/2011
DE    112012005487 B4 *    11/2021    ......... B60C 23/0416
(Continued)

OTHER PUBLICATIONS

Supplementary European Search Report issued in EP Application No. 17851949.2-1215, dated Sep. 12, 2019; 7 pages.
(Continued)

*Primary Examiner* — Andre J Allen
(74) *Attorney, Agent, or Firm* — Cantor Colburn LLP

(57) ABSTRACT

A reception control section obtains the rotation angles of wheel assemblies when receiving transmission data by a reception circuit. The reception control section divides 360°, which is the range of the possible rotation angles of the wheel assembly, into equal parts to obtain angle ranges and assigns each of the obtained rotation angles to one of angle ranges. The reception control section derives the angle range in which the number of times (frequency) the obtained rotation angles are included is a maximum value. The reception control section calculates a reception-side angle difference, which is the difference between the median values of the angle ranges in which the number of times the obtained rotation angle is included is a maximum value. The reception control section associates the ID codes with the wheel assemblies based on the correspondence between the reception-side angle difference and the angle difference between specific angles.

5 Claims, 7 Drawing Sheets

(51) Int. Cl.
*G01L 17/00* (2006.01)
*G08C 17/02* (2006.01)

(52) U.S. Cl.
CPC .......... *B60C 23/0489* (2013.01); *G01L 17/00* (2013.01); *G08C 17/02* (2013.01); *H01Q 1/2241* (2013.01)

(58) Field of Classification Search
CPC . B60C 23/0433; B60C 23/0493; B60C 19/00; B60C 23/04; B60C 23/041; B60C 23/0411; B60C 23/0462; B60C 23/20; B60C 23/0444; B60C 11/24; B60C 23/0479; B60C 23/064; B60C 23/007; B60C 23/062; B60C 23/0401; B60C 23/0413; B60C 23/0488; B60C 23/043; B60C 23/06; B60C 23/0452; B60C 23/0467; B60C 11/246; B60C 23/0498; B60C 23/02; B60C 99/006; B60C 23/0428; B60C 23/0442; B60C 23/009; B60C 23/0425; B60C 2019/004; B60C 23/004; B60C 11/243; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/044; B60C 23/00; B60C 23/008; B60C 23/0455; B60C 23/0454; B60C 23/0461; B60C 23/0483; B60C 23/0474; B60C 23/0415; B60C 23/0491; B60C 23/0489; B60C 25/002; B60C 29/064; B60C 23/00363; B60C 23/0471; B60C 11/0318; B60C 23/0459; B60C 23/0481; B60C 2019/005; B60C 23/002; B60C 23/042; B60C 23/0422; B60C 23/0423; B60C 23/0466; B60C 2200/02; B60C 23/0405; B60C 23/0477; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 13/00; B60C 19/003; B60C 23/0484; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 23/12; B60C 25/18; B60C 11/13; B60C 23/0418; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22
USPC .................................................. 73/146–146.8
See application file for complete search history.

(56) References Cited

U.S. PATENT DOCUMENTS

| | | |
|---|---|---|
| 2006/0012469 A1 | 1/2006 | Hirai |
| 2011/0071737 A1 | 3/2011 | Greer et al. |
| 2012/0112899 A1 | 5/2012 | Hannon |
| 2014/0055255 A1 | 2/2014 | Kim |
| 2014/0184403 A1 | 7/2014 | Kabushiki et al. |
| 2015/0191056 A1 | 7/2015 | Mori et al. |
| 2017/0259627 A1 | 9/2017 | Araya |
| 2019/0070908 A1* | 3/2019 | Tsujita .................. G08C 17/02 |
| 2019/0070911 A1* | 3/2019 | Tsujita ................ B60C 23/0488 |
| 2020/0255065 A1* | 8/2020 | Tsujita ................ B60C 23/0489 |
| 2020/0300732 A1* | 9/2020 | Tsujita .................. G08C 17/00 |

FOREIGN PATENT DOCUMENTS

| | | | | |
|---|---|---|---|---|
| DE | 112013000606 B4 * | 11/2021 | ......... | B60C 23/0408 |
| EP | 2759418 A1 | 7/2014 | | |
| JP | 2012111481 A | 6/2012 | | |
| JP | 2014227124 A | 12/2014 | | |
| JP | 201513635 A | 1/2015 | | |
| JP | 2012111481 A | 6/2016 | | |
| KR | 101388622 B1 | 4/2014 | | |
| KR | 1020150041023 A | 4/2015 | | |
| KR | 20170040780 A | 4/2017 | | |
| WO | 2016190371 A1 | 1/2016 | | |
| WO | 2016190371 A1 | 12/2016 | | |
| WO | WO-2020070781 A1 * | 4/2020 | ......... | B60C 23/0416 |
| WO | WO-2020070782 A1 * | 4/2020 | ......... | B60C 23/0416 |

OTHER PUBLICATIONS

Non-Final Office Acton issued in U.S. Appl. No. 15/765,435 dated Mar. 7, 2019; 14 pages.
Office Action issued in Korean Patent Application No. 10-2018-7009683, dated Apr. 26, 2019; 4 pages.

(56) References Cited

OTHER PUBLICATIONS

Notification of Reason for Refusal issued in Korean Patent Application No. 10-2018-7014506, dated Jul. 23, 2019; 8 pages.

* cited by examiner

| Group | First Group | Second Group | Third Group | Fourth Group |
|---|---|---|---|---|
| Last Digit of ID | 0~3 | 4~7 | 8~B | C~F |
| Specific Angles | First Angle Second Angle | First Angle Third Angle | First Angle Fourth Angle | First Angle Fifth Angle |
| Angle Difference | 180° | 90° | 120° | 150° | ns/RECEIVER AND TRANSMITTER UNIT FOR TIRE CONDITION MONITORING APPARATUS

TECHNICAL FIELD

The present invention relates to a receiver and a transmitter unit.

BACKGROUND ART

A tire condition monitoring apparatus is known as an apparatus that allows a driver to check the condition of the tires of a vehicle from the passenger compartment. The tire condition monitoring apparatus includes a transmitter unit and a receiver mounted on the vehicle. The transmitter unit includes transmitters respectively attached to the wheel assemblies of the vehicle. Each of the transmitters transmits transmission data to the receiver. The transmission data transmitted from the transmitter includes data indicating the condition of the tire. The receiver receives the transmission data to acquire the condition of the tire.

In the tire condition monitoring apparatus described above, it is preferable that the receiver can identify the tire to which the tire condition included in the transmission data corresponds. In other words, it is preferable that the receiver can identify the wheel assembly to which the transmitter that has transmitted the received transmission data is attached. This type of tire condition monitoring apparatus is disclosed in Patent Document 1.

The tire condition monitoring apparatus disclosed in Patent Document 1 is mounted on a vehicle including rotation angle detecting devices that detect the rotation angles of the wheel assemblies. When detecting that the rotation angle of the wheel assembly matches a specific angle, the transmitter transmits transmission data. The receiver acquires the rotation angle of each wheel assembly from the detection result of the rotation angle detecting device upon reception of the transmission data. The receiver identifies the wheel assembly to which each of the transmitters is attached based on variation of the rotation angle of each wheel assembly obtained upon reception of the transmission data.

PRIOR ART DOCUMENT

Patent Document

Patent Document 1: Japanese Laid-Open Patent Publication No. 2014-227124

SUMMARY OF THE INVENTION

Problems that the Invention is to Solve

The angle (transmission angle) at which transmission data is transmitted may deviate from the specific angle due to factors such as the detection accuracy of the specific angle and the traveling condition of the vehicle. In particular, when the vehicle is traveling on a bad road, the deviation between the transmission angle and the specific angle may increase. As a result, it may be impossible to identify the wheel assembly to which each transmitter is attached.

Accordingly, it is an objective of the present invention to provide a receiver and a transmitter unit that are capable of identifying the wheel assembly to which each transmitter is attached even when the vehicle is traveling on a bad road.

Means for Solving the Problems

To achieve the foregoing objective and in accordance with a first aspect of the present invention, a receiver is provided that is configured to be mounted on a vehicle having rotation angle detecting sections each of which detects rotation angles of one of wheel assemblies. A transmitter is attached to each wheel assembly. The receiver is configured to identify the wheel assembly to which each transmitter is attached. The receiver includes a receiving section, an obtaining section, an acquiring section, and an identifying section. The receiving section is configured to receive transmission data that is transmitted from each transmitter when the transmitter detects that the associated wheel assembly is at any of specific angles set in possible rotation angles of the wheel assembly. The obtaining section is configured to obtain the rotation angles from the rotation angle detecting section upon reception of the transmission data by the receiving section. The acquiring section is configured to assign each of the rotation angles obtained by the obtaining section to one of angle ranges that are obtained by dividing possible rotation angles of the wheel assembly into equal parts, and to acquire a number of times the rotation angles obtained by the obtaining section are included in each angle range. The identifying section is configured to associate ID codes included in the transmission data with the wheel assemblies based on whether, in the angle ranges in which the number of times acquired by the acquiring section are maximum values, an angle difference between the specific angles matches a reception-side angle difference, which is an angle difference between the rotation angles at which deviation angles from minimum angles in the angle ranges are equal to each other.

When the transmitter transmits transmission data when it detects that the rotation angle of the wheel assembly is the specific angle, the transmission angle, at which the transmission data is transmitted, varies with respect to the specific angle as the center of the variation. Thus, the closer to the specific angle, the more frequently the transmission data is transmitted (the probability of transmission increases). When the rotation angle of each wheel assembly is obtained upon reception of the transmission data and the number of times the obtained rotation angle (hereinafter referred to as an obtained rotation angle) is included in each angle range is acquired, the obtained rotation angles concentrate in a specific angle range for one of the wheel assemblies. As a result, one of the wheel assemblies has an angle range in which the obtained rotation angle is a maximum value. Since multiple specific angles are set, the number of angle ranges in which the obtained rotation angle is a maximum value is also plural in accordance with the number of the specific angles.

Since the specific angle ranges appear in correspondence with the specific angles, the reception-side angle difference matches the angle difference between the specific angles in each of the specific angle ranges. Therefore, by associating the ID codes included in the transmission data with the wheel assemblies based on whether the reception-side angle difference matches the angle difference between the specific angles, the receiver is allowed to identify the wheel assembly to which each transmitter is attached.

If the vehicle is traveling on a bad road, transmission data may be accidentally transmitted at an angle that deviates significantly from the specific angle. The frequency at which the transmission data is transmitted at an angle significantly deviated from the specific angle is less than the frequency at which the transmission data is transmitted at an angle near the specific angle. Thus, even if the transmission data is transmitted at an angle significantly deviated from the specific angle, there is an angle range in which the number of times the obtained rotation angles is included is a maximum value. Therefore, even when the vehicle is traveling on a bad road, it is possible to identify the wheel assembly to which each transmitter is attached.

In the above-described receiver, the angle ranges may be in one of a plurality of sets of angle ranges that are obtained by dividing possible rotation angles of the wheel assembly into different numbers of equal parts, and the acquiring section may be configured to acquire a number of times the rotation angles obtained by the obtaining section are included in each of the angle ranges.

With this configuration, it suffices that the number of times the obtained rotation angle is included in any of the angle ranges equally divided at different angles is a maximum value. This facilitates the identification of the wheel assembly to which each transmitter is attached.

In the above-described receiver, the acquiring section may be configured to: acquire a number of times the rotation angles obtained by the obtaining section are included in each of the angle ranges; and change a phase of the angle ranges and acquire a number of times the rotation angles obtained by the obtaining section are included in each of the angle ranges the phase which has been changed.

With this configuration, the rotation angle included in the angle range is different between before and after the change of the phase. Thus, a maximum value tends to appear in either the angle range before changing the phase or the angle range after changing the phase. This facilitates the identification of the wheel assembly to which each transmitter is attached.

In the above-described receiver, the angle difference between the specific angles may vary among the transmitters attached to the wheel assemblies, and the receiver may comprise a reception storage section, which stores the ID codes of the transmitters and the angle difference between the specific angles in association with each other.

With this configuration, the receiver is capable of identifying the wheel assembly to which each transmitter is attached based on whether the angle difference between the specific angles matches the ID code in addition to whether the reception-side angle difference matches the angle difference between the specific angles. Accordingly, the reliability of the receiver is improved.

To achieve the foregoing objective and in accordance with a second aspect of the present invention, a transmitter unit is provided that includes a plurality of transmitters, each of which is configured to be attached to one of wheel assemblies of a vehicle each having a rotation angle detecting section that detects rotation angles of the associated wheel assembly and transmits transmission data to a receiver mounted on the vehicle. The receiver is configured to: assign each of the rotation angles obtained from the rotation angle detecting sections upon reception of the transmission data to one of angle ranges that are obtained by dividing possible rotation angles of the wheel assembly into equal parts; acquire a number of times the rotation angles obtained from the rotation angle detecting sections are included in each of the angle ranges; and be capable of identifying the wheel assembly to which each transmitter is attached based on the angle range in which the number of times is a maximum value. Each transmitter includes a transmission storage section in which an individual ID code is stored, a specific angle detecting section configured to detect that the wheel assembly is at any of specific angles set in possible rotation angles of the wheel assembly, and a transmission section configured to transmit the transmission data including the ID code when it is detected that the rotation angle of the wheel assembly matches one of the specific angles, thereby causing the receiver to identify the wheel assembly to which each transmitter is attached. The angle difference between the specific angles varies among the transmitters.

Since each of the transmitters of the transmitter unit transmits the transmission data at the multiple specific angles, it is possible to identify the wheel assembly to which each transmitter is attached based on the angle difference between the specific angles and the reception-side angle difference. Furthermore, since the angle difference between the specific angles varies among the transmitter, it is possible to identify the wheel assembly to which each transmitter is attached based on whether the angle difference between the specific angles matches the ID code in addition to whether the reception-side angle difference matches the angle difference between the specific angles. Accordingly, the reliability of the receiver is improved.

Effects of the Invention

The present invention allows for identification of the wheel assembly to which each transmitter is attached even when the vehicle is traveling on a bad road.

MODES FOR CARRYING OUT THE INVENTION

First Embodiment

A receiver according to a first embodiment will now be described.

Figure 1B:
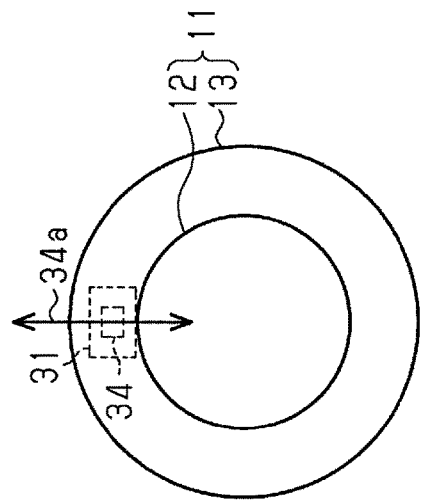
FIG. 1B is a schematic diagram illustrating the relationship between each wheel assembly of the vehicle and the detection axis of an acceleration sensor.
Figure 1A:
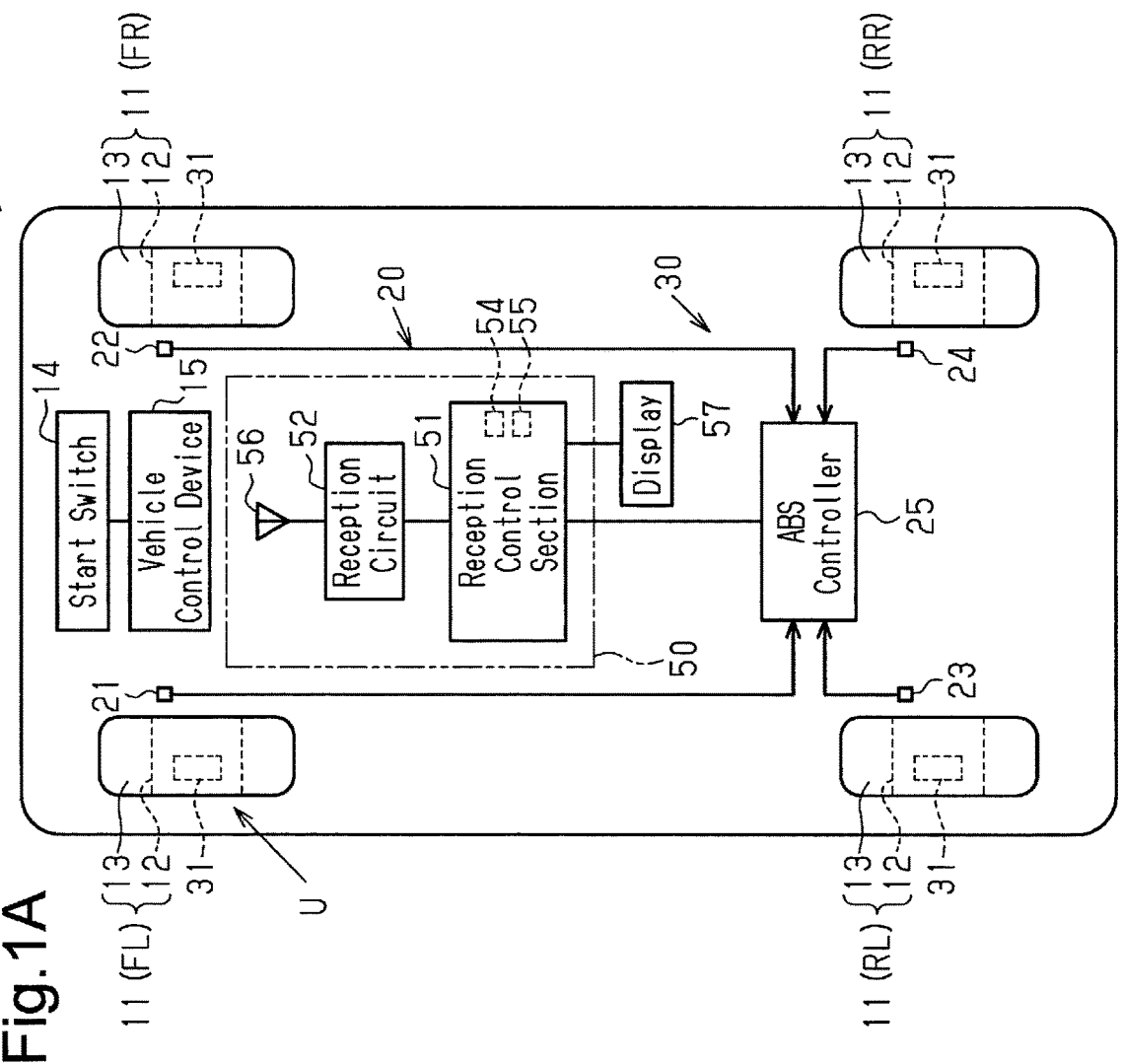
FIG. 1A is a block diagram illustrating a tire condition monitoring apparatus mounted on a vehicle.

As shown in FIG. 1A, a tire condition monitoring apparatus 30 is mounted on a vehicle 10. At first, the vehicle 10 is described.

The vehicle 10 includes a start switch 14 and a vehicle controller 15. The vehicle controller 15 switches state of the vehicle 10 between an activated state and a deactivated state in accordance with operation of the start switch 14. In the activated state of the vehicle 10, the vehicle 10 travels based on operation of the acceleration pedal by the driver or an on-vehicle device such as the air conditioner operates based on operation of the on-vehicle device by the driver. In the deactivated state of the vehicle 10, the travelling of the vehicle 10 and the operation of the on-vehicle device are not allowed even if operation of the driver is performed.

The vehicle 10 includes four wheel assemblies 11. Each of the wheel assemblies 11 includes a wheel 12 and a tire 13 attached to the wheel 12. When necessary, the wheel assembly 11 at the right front side will be referred to as a right front wheel assembly FR, the wheel assembly 11 at the left front side will be referred to as a left front wheel assembly FL, the wheel assembly 11 at the right rear side will be referred to as the right rear wheel assembly RR, and the wheel assembly 11 at the left rear side will be referred to as a left rear wheel assembly RL.

The vehicle 10 includes an antilock braking system (ABS) 20. The ABS 20 includes an ABS controller 25, and rotation sensors 21 to 24 corresponding to the four wheel assemblies 11, respectively. The first rotation sensor unit 21 corresponds to the left front wheel assembly FL, and the second rotation sensor unit 22 corresponds to the right front wheel assembly FR. The third rotation sensor unit 23 corresponds to the left rear wheel assembly RL, and the fourth rotation sensor unit 24 corresponds to the right rear wheel assembly RR. The ABS controller 25 is configured by circuitry such as a microcomputer, that is, a processor, and is programmed to determine the rotation angles of the wheel assemblies 11 based on signals from the rotation sensor units 21 to 24. The ABS controller 25 and the rotation sensor units 21 to 24 serve as a rotation angle detecting section.

Figure 2:
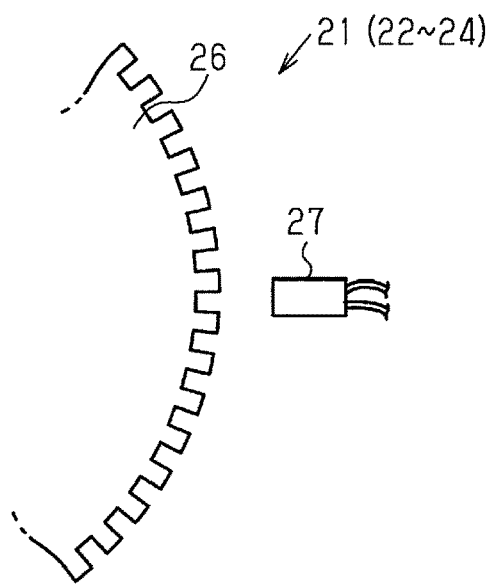
FIG. 2 is a schematic diagram of a rotation sensor unit.
Figure 3:
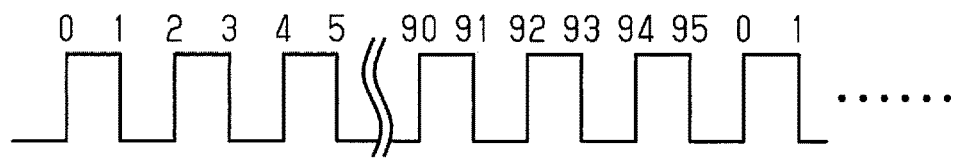
FIG. 3 is a schematic diagram of pulses generated by rotation of the wheel assembly.

As shown in FIG. 2, each of the rotation sensor units 21 to 24 includes a gear (pulse wheel) 26, which rotates integrally with the wheel assembly 11, and a detector 27 arranged to face the outer peripheral surface of the gear 26. Forty-eight teeth are arranged on the outer peripheral surface of the gear 26 at the same angular intervals. The detector 27 detects pulses generated when the gear 26 is rotated. The ABS controller 25 is connected to the detector 27 by wire and obtains the rotation angle of each of the wheel assemblies 11 based on a count value of the pulses (hereinafter, referred to as a pulse count value) as a detection value of each of the detectors 27. Specifically, when the gear 26 is rotated, the pulses corresponding to the number of the teeth are generated in the detector 27. The ABS controller 25 counts the pulses generated in the detector 27. As shown in FIG. 3, in the present embodiment, rising edges and falling edges of the pulses are counted. Since the number of the teeth is forty-eight, the ABS controller 25 counts the pulse from 0 to 95. Thus, the resolution of each of the rotation sensor units 21 to 24 is 3.75°.

The tire condition monitoring apparatus 30 will now be described.

As shown in FIG. 1A, the tire condition monitoring apparatus 30 includes a transmitter unit U and a receiver 50 installed in the vehicle 10. The transmitter unit U includes four transmitters 31 respectively attached to the four wheel assemblies 11. The transmitter 31 is attached to the wheel assembly 11 so as to be arranged in the inner space of the tire 13. The transmitter 31 is fixed to the tire valve, the wheel 12, or the tire 13. The transmitter 31 detects the condition (for example, the tire air pressure and tire internal temperature) of the corresponding tire 13 and wirelessly transmits transmission data including detected information of the tire 13 to the receiver 50. The tire condition monitoring apparatus 30 monitors the condition of the tire 13 by receiving the transmission data transmitted from the transmitter 31 through the receiver 50.

Figure 4:
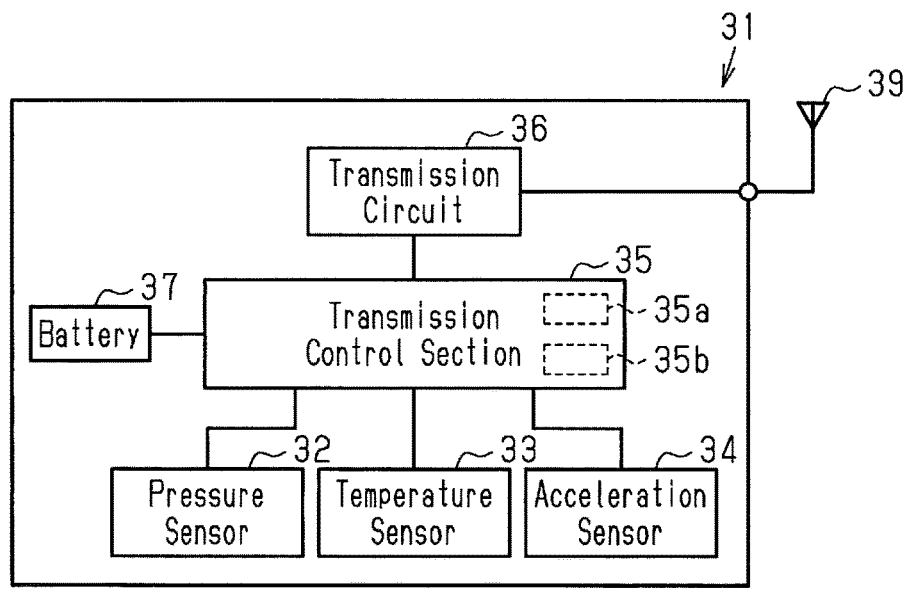
FIG. 4 is a block diagram illustrating a schematic configuration of a transmitter.

As shown in FIG. 4, each of the transmitters 31 includes a pressure sensor 32, a temperature sensor 33, an acceleration sensor 34, a transmission control section 35, a transmission circuit 36, a battery 37, and a transmission antenna 39. The transmitter 31 is driven by power supplied from the battery 37, and the transmission control section 35 controls operation of the transmitter 31 in an integrated manner. The battery 37 may be a primary battery or a power storage device such as a rechargeable battery and a capacitor.

The pressure sensor 32 detects the air pressure of the corresponding tire 13. The pressure sensor 32 outputs the detection result to the transmission control section 35. The temperature sensor 33 detects the temperature inside the corresponding tire 13. The temperature sensor 33 outputs the detection result to the transmission control section 35.

As shown in FIG. 1B, the acceleration sensor 34 includes a detection axis 34a so as to detect acceleration in the axial direction of the detection axis 34a. The acceleration sensor 34 outputs the detection result to the transmission control section 35. The acceleration sensor 34 may be a uniaxial acceleration sensor 34 or a multiaxial acceleration sensor 34.

The acceleration sensor 34 is arranged such that the detection axis 34a is directed downward in the vertical direction when the transmitter 31 is located at the lowermost position or the uppermost position of the wheel assembly 11.

If a multiaxial acceleration sensor 34 having a detection axis other than the detection axis 34a is employed, the acceleration applied in each of the detection axes is independently detected. Hereinafter, the acceleration detected by the acceleration sensor 34 denotes acceleration detected in the detection axis 34a.

As shown in FIG. 4, the transmission control section 35 is configured by circuitry such as a microcomputer, that is, a processor, which includes a CPU 35a and a transmission storage section 35b. The transmission storage section 35b may be any type of memory such as a RAM, a ROM and the like. An ID code indicating individual identification information of each of the transmitters 31 is stored in the transmission storage section 35b. For the illustrative purposes, the ID code of the transmitter 31 attached to the left front wheel assembly FL is referred to as FLID, the ID code of the transmitter 31 attached to the right front wheel assembly FR is referred to as FRID, the ID code of the transmitter 31 attached to the left rear wheel assembly RL is referred to as RLID, and the ID code of the transmitter 31 attached to the right rear wheel assembly RR is referred to as RRID.

Various programs for controlling the transmitter 31 are stored in the transmission storage section 35b. The transmission control section 35 includes a timing function. The timing function is implemented by, for example, a timer or a counter. The transmission control section 35 obtains detection results detected by the pressure sensor 32, the temperature sensor 33, and the acceleration sensor 34 at a predetermined obtaining interval.

The transmission control section 35 generates transmission data including, for example, a tire condition such as the tire air pressure and the tire internal temperature, and the ID code based on the detection result. The transmission control section 35 outputs the generated transmission data to the transmission circuit 36. The transmission circuit 36 modulates the transmission data output from the transmission control section 35. The modulated transmission data is transmitted from the transmission antenna 39 as a wireless signal. The wireless signal is transmitted as, for example, a signal of an RF band (for example, a 315 MHz band and a 434 MHz band). The transmission circuit 36 serves as a transmission section.

The transmitter 31 executes two different transmission modes: normal transmission, at which the transmission data is transmitted regardless of the rotation angle of the wheel assembly 11, and specific angle transmission, at which the transmission data is transmitted when the rotation angle of the wheel assembly 11 matches a predetermined specific angle.

At the normal transmission, the transmission data is transmitted at a predetermined interval. The predetermined interval is set to, for example, ten seconds to several tens of seconds. For example, the specific angle transmission is executed when the vehicle 10 is started to travel after the vehicle 10 has been in a stopped state continuously for a predetermined time or longer. The predetermined time is set to a time in which a tire can be replaced, for example, several tens of minutes to several hours. That is, the specific angle transmission is executed when the position of the wheel assembly 11 has possibly been changed due to tire rotation and the like. Whether the vehicle 10 is traveling or in a stopped state is determined based on the centrifugal acceleration, which is the detection result of the acceleration sensor 34.

At the specific angle transmission, the transmission data is transmitted when the transmission control section 35 detects that the rotation angle of the wheel assembly 11 matches the predetermined specific angle. Specifically, the transmission control section 35 transmits the transmission data when the specific angle is detected and a predetermined time (for example, ten seconds to several tens of seconds) has elapsed since the last transmission of the transmission data.

Figure 5A:
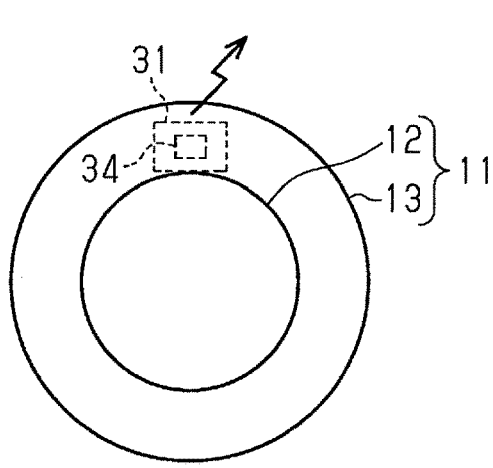
FIG. 5A is a schematic diagram illustrating a first angle.
Figure 5B:
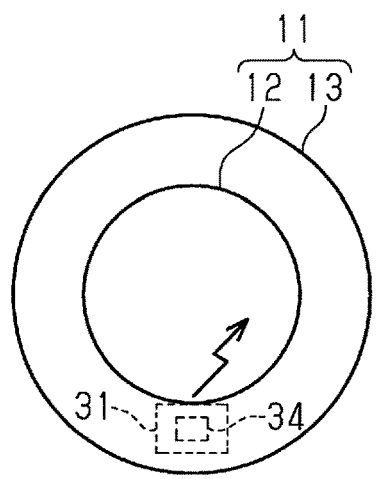
FIG. 5B is a schematic diagram illustrating a second angle.

As shown in FIGS. 5A and 5B, multiple specific angles are set, which include a first angle when the transmitter 31 is located at the uppermost position of the wheel assembly 11 and a second angle when the transmitter 31 is located at the lowermost position of the wheel assembly 11. When the first angle is defined as a reference (0°), the second angle is 180°. The angle difference between the first angle and the second angle is 180°.

Whether the transmitter 31 is located at a position corresponding to the specific angle can be detected based on the acceleration detected by the acceleration sensor 34. The axial direction of the detection axis 34a is the same as the direction in which the centrifugal force is applied regardless of the rotation angle of the wheel assembly 11. Thus, the acceleration sensor 34 detects the centrifugal acceleration regardless of the rotation angle of the wheel assembly 11. On the other hand, the gravitational acceleration is always applied in the vertical direction. Thus, in a case in which the detection axis 34a is not directed in the vertical direction, the acceleration sensor 34 detects a component force of the gravitational acceleration (a component of the gravitational acceleration). The acceleration sensor 34 detects an acceleration obtained by adding the gravitational acceleration to the centrifugal acceleration.

Unless the vehicle 10 is abruptly accelerated or stopped, the centrifugal acceleration changes slightly in one turn of the wheel assembly 11. Accordingly, the acceleration changed in one turn of the wheel assembly 11 is deemed as the gravitational acceleration. Thus, whether the rotation angle of the wheel assembly 11 matches the specific angle can be detected by using a change of the gravitational acceleration. When only the gravitational acceleration is considered, the gravitational acceleration changes in one turn of the wheel assembly 11 in a range between +1G and −1G inclusive. In this case, the gravitational acceleration is +1G when the transmitter 31 is located at the lowermost position of the wheel assembly 11, and the gravitational acceleration is −1G when the transmitter 31 is located at the uppermost position of the wheel assembly 11.

The transmission control section 35 transmits the transmission data when detecting that the rotation angle of the wheel assembly matches the specific angle by transmitting the transmission data based on the acceleration detected by the acceleration sensor 34. In the present embodiment, the acceleration sensor 34 serves as a specific angle detecting section.

The receiver 50 will now be described.

As shown in FIG. 1A, the receiver 50 includes a reception control section 51, a reception circuit 52, and a reception antenna 56. The reception control section 51 is connected to a display 57 mounted on the vehicle 10. The reception control section 51 is configured by circuitry such as a microcomputer, that is, a processor or the like including a reception CPU 54 and a reception storage section 55 (a ROM, a RAM and the like). The reception control section 51 includes a timing function. The timing function is implemented by, for example, a timer or a counter. The reception circuit 52 demodulates the wireless signal received from each of the transmitters 31 via the reception antenna 56 and outputs the transmission data to the reception control section 51. The reception circuit 52 serves as a receiving section.

The reception control section 51 acquires the condition of the tire 13 such as the tire air pressure and the tire internal temperature based on the transmission data from the reception circuit 52. When an anomaly occurs in the tire 13, the reception control section 51 executes informing by using the display 57. The display 57 displays the pressure of each of the tires 13 in association with the positions of the wheel assemblies 11.

The reception storage section 55 stores the ID codes of the four transmitters 31 mounted on the wheel assemblies 11 of the vehicle 10 on which the receiver 50 is mounted. With this, the receiver 50 is associated with the transmitters 31. The reception control section 51 recognizes the transmission data transmitted from the four transmitters 31 as the transmission data transmitted to the reception control section 51. The reception control section 51 compares the identification information (ID code) registered to the transmitter 31 that has transmitted the transmission data with the identification information (ID code) registered to the receiver 50 based on the transmission data received by the reception circuit 52 and the ID code stored in the reception storage section 55.

In a case in which the transmission data is transmitted from the transmitter 31 associated with the receiver 50, the reception control section 51 deems data (pressure data and temperature data) indicating the condition of the tire 13 included in the transmission data as data of the vehicle 10 on which the receiver 50 is mounted.

Next, a wheel assembly position identifying process for identifying the wheel assembly 11 to which each of the transmitters 31 is attached will be described together with the operation thereof. The wheel assembly position identifying process is executed, for example, when the vehicle 10 is switched from the deactivated state to the activated state through an operation of the start switch 14. Hereinafter, the transmission mode of the transmitter 31 is set to the specific angle transmission. With this, the reception control section 51 is capable of automatically recognizing the wheel assembly 11 to which each of the transmitters 31 is attached even when the tire rotation is performed.

The reception control section 51 obtains the pulse count values (the rotation angle of the wheel assembly 11) of the rotation sensor units 21 to 24 from the ABS controller 25 upon reception of the transmission data by the reception circuit 52, and the reception control section 51 calculates the rotation angle of the wheel assembly 11 based on the pulse count value. The reception control section 51 serves as an obtaining section. That is, the obtaining section is a part of the functions of the reception control section 51.

In the travelling of the vehicle 10, the numbers of rotations (the rotation speeds) of the wheel assemblies 11 are different from each other due to the influence of the differential gear or the like. Thus, the relative positions of the transmitters 31 attached to the wheel assemblies 11, namely the differences between the rotation angles of the wheel assemblies 11 change in accordance with the travelling of the vehicle 10. Thus, in a case in which the transmitters 31 transmit the transmission data at the specific angle, the reception control section 51 obtains the rotation angle of each of the four wheel assemblies 11 several times upon reception of the transmission data. Consequently, the variation of the rotation angle of one wheel assembly 11 among the four wheel assemblies 11 becomes small. In other words, in a case in which the transmitters 31 transmit the transmission data at the specific angles, when the pulse count value is obtained upon reception of the transmission data, one of the rotation sensor units 21 to 24 has a small value of the variation of the pulse count value.

The pulse count value is reset when the vehicle 10 is set to the deactivated state by the start switch 14. Accordingly, the correlation between the absolute angle of the wheel assembly 11 detected by the rotation sensor units 21 to 24 and the specific angle is changed each time the vehicle 10 is switched to the deactivated state. On the other hand, the relative angle (angle difference) between the rotation angle of the wheel assembly 11 that is obtained upon reception of the transmission data transmitted at the first angle and the rotation angle of the wheel assembly 11 that is obtained upon reception of the transmission data transmitted at the second angle is not affected by the reset of the pulse count value.

It is now assumed that the transmitters 31 can always transmit transmission data at specific angles (the first angle and the second angle), and the time required for transmission and reception is always constant. When the rotation angles of the four wheel assemblies 11 are obtained upon reception of transmission data, only two rotation angles of one of the four wheel assemblies 11 are obtained. One of these two rotation angles is obtained upon reception of the transmission data transmitted at the first angle, and the other is obtained upon reception of the transmission data transmitted at the second angle.

As described above, although the absolute angles of these two rotation angles can take different values each time the vehicle 10 is in the deactivated state, the angle difference (relative angle) matches the angle difference between the first angle and the second angle. Thus, when the rotation angles of the four wheel assemblies 11 are obtained upon reception of the transmission data transmitted at the specific angles, there will be one wheel assembly 11 in which the angle difference between the obtained two rotation angles matches the angle difference between the first angle and the second angle.

If the angle difference between the first angle and the second angle is 180°, there will be one wheel assembly 11 in which the angle difference between the two rotation angles is 180°. Accordingly, when the transmitter 31 is transmitting transmission data at multiple specific angles, it is possible to identify the wheel assembly 11 to which each transmitter 31 is attached based on the angle difference of the rotation angles obtained upon reception of the transmission data.

However, in reality, it is difficult for the transmitter 31 to always transmit transmission data at the specific angles. The transmission control section 35 transmits transmission data when detecting the specific angle, but the angle at which the transmission data is actually transmitted (hereinafter, referred to as a transmission angle) may deviate from the specific angle in some cases. This is due to the accuracy of the acceleration sensor 34, the obtaining interval at which the transmission control section 35 obtains detection result from the acceleration sensor 34, and the disturbance caused by the travelling condition. In particular, when the vehicle 10 is traveling on a bad road, errors due to disturbances are likely to be included in the acceleration, and a large angle difference may occur between the specific angle and the transmission angle.

When the transmission data is transmitted based on the detection of the specific angle, it is not always possible to transmit the transmission data at the specific angle, but the transmission data is transmitted more frequently at angles closer to the specific angle (the probability of transmission increases). This tendency is common to a case of a poor traveling condition such as a bad road and a case of a favorable traveling condition such as a smooth road.

Figure 6:
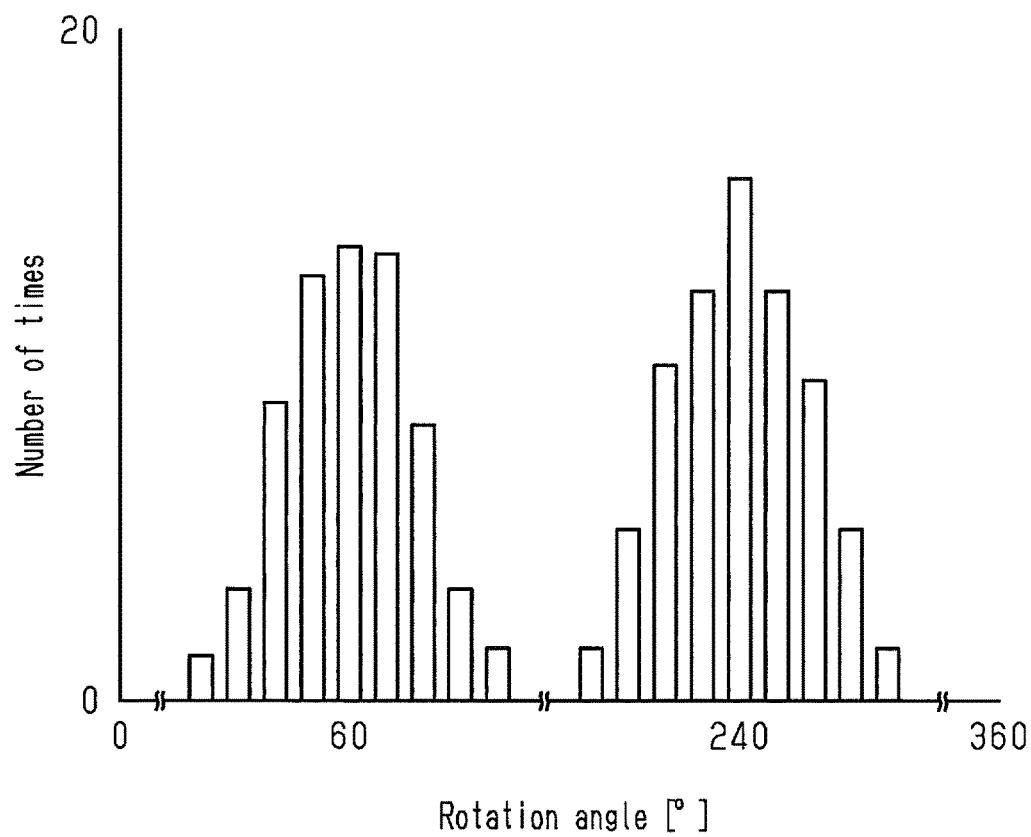
FIG. 6 is a diagram showing the distribution when obtaining the rotation angle of the wheel assembly to which is attached the transmitter that has transmitted the transmission data transmitted at the specific angle upon reception of the transmission data.

Due to the deviation of the transmission angle from the specific angle, variation also occurs in the rotation angle obtained upon reception of the transmission data. For example, when the rotation angle of the wheel assembly 11 to which the transmitter 31 that has transmitted transmission data is attached is obtained upon reception of the transmission data, the number of times the rotation angle is obtained will be distributed as shown in FIG. 6. In contrast, when the rotation angle of the wheel assembly 11 to which the transmitter 31 that has transmitted transmission data is not attached is obtained upon reception of the transmission data, the number of times the rotation angle is obtained will be distributed irregularly. In the following description, the rotation angle obtained upon reception of the transmission data will be referred to as an obtained rotation angle. The obtained rotation angles shown in FIG. 6 are assumed to be obtained as rotation angles detected by the rotation sensor unit 22 corresponding to the right front wheel assembly FR upon reception of the transmission data transmitted from the transmitter 31 of the FRID.

In the example shown in FIG. 6, the number of times the obtained rotation angles are angles around 60° and 240° is great, and the number of times decreases as the obtained angles deviate from 60° and 240°. FIG. 6 shows the distribution of the number of times the obtained rotation angles are obtained. From the fact that the obtained rotation angles are obtained upon reception of the transmission data, the transmission angles at which the transmission data is transmitted also tends to be distributed approximately as shown in FIG. 6. That is, if 60° and 240° correspond to specific angles, the transmission angles vary around these angles as the centers.

As can be seen from FIG. 6, at angles around 60° and angles around 240°, clear differences are not likely to appear in the number of times of the obtainments. Depending on the traveling condition and the like, the obtained rotation angle at which the number of times of obtainments becomes a maximum value may change in some cases. For example, the obtained rotation angle at which the number of times of obtainments becomes a maximum value may be 60°, 63.75° or 56.25°. Accordingly, it is understood that the obtained rotation angle corresponding to the specific angle of the transmitter 31 is around 60° and 240°, but it is impossible to accurately determine the obtained rotation angle corresponding to the specific angle.

In the wheel assembly position identifying process of the present embodiment, the obtained rotation angles are divided with a resolution coarser (larger) than that of the rotation sensor units 21 to 24, so that the wheel assembly 11 to which each transmitter 31 is attached is identified. The details will be illustrated below.

The reception control section 51 divides 360°, which is the range of the possible rotation angles of the wheel assembly 11, into equal parts to obtain angle ranges and assigns each of the obtained rotation angles to one of the angle ranges. As a result, a histogram is created in which each segment represents the number of times the obtained rotation angles is included in an angle range. In the present embodiment, two types of angle ranges are set: angle ranges obtained by dividing 360° into six equal parts and angle ranges obtained by dividing 360° into eight equal parts. The reception control section 51 functions as an acquiring section. That is, the acquiring section is a part of the functions of the reception control section 51.

Figure 7:
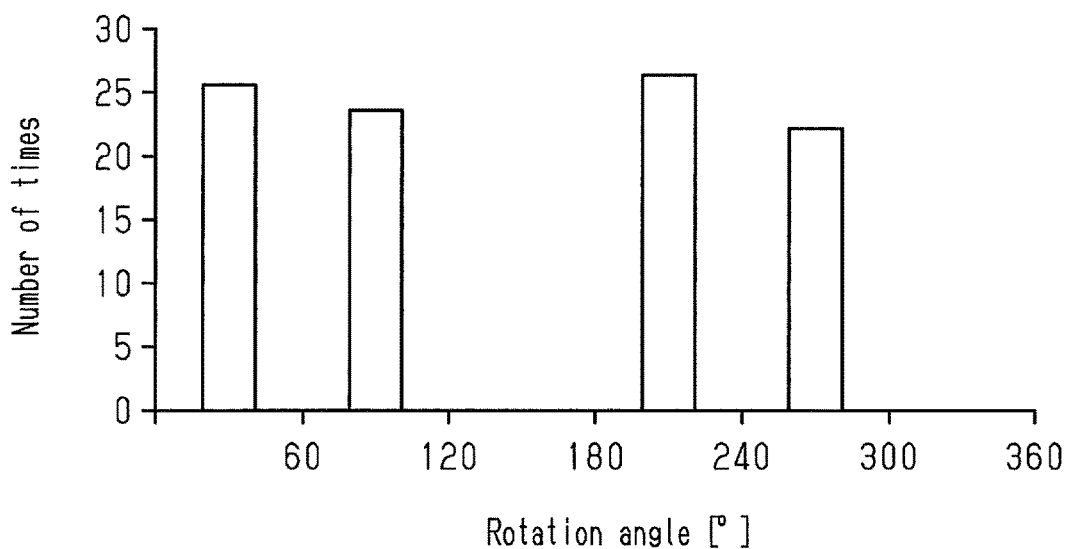
FIG. 7 is a diagram showing angle ranges obtained by dividing 360° into six equal parts.

As shown in FIG. 7, when 360° is divided into six equal parts, each angle range is 60°. The angle ranges include a range from 1° to 60°, a range from 61° to 120°, a range from 121° to 180°, a range from 181° to 240°, a range from 241° to 300°, and a range from 301° to 360°.

Figure 8:
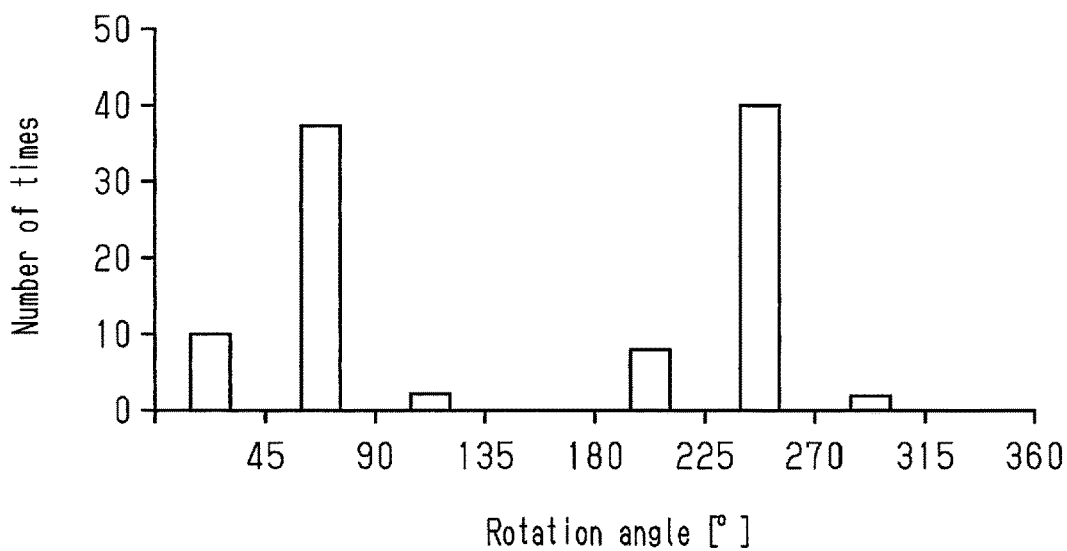
FIG. 8 is a diagram showing angle ranges obtained by dividing 360° into eight equal parts.

As shown in FIG. 8, when 360° is divided into eight equal parts, each angle range is 45°. The angle ranges include a range from 1° to 45°, a range from 45° to 90°, a range from 91° to 135°, a range from 136° to 180°, a range from 181° to 225°, a range from 226° to 270°, a range from 271° to 315°, and a range from 316° to 360°.

In the above example, 360° is divided into six or eight equal parts. However, the number of equal parts (hereinafter, referred to as a divisor) may be changed as necessary. The divisor is a value that is determined by taking into consideration the count number of the pulse count value (96 in the present embodiment), the number of the specific angles, and the angular difference between the specific angles. The divisor is less than the count number of the pulse count value. In other words, the divisor is a value that can equally divide 360° into angle ranges larger than the resolution of the rotation sensor units 21 to 24. The divisor is preferably a submultiple of the number of teeth of the gear 26, and more preferably an even number in the submultiples.

The reception control section 51 derives the angle range in which the number of times (frequency) the obtained rotation angles are included is a maximum value for each of the angle ranges divided into equal parts by different values. Whether or not the number of times the obtained rotation angles are included in each angle range is a maximum value is determined, for example, based on whether or not the difference between the numbers of times the obtained rotation angles are included in the adjacent angle ranges is greater than or equal to a threshold. The threshold is set based on experimental results or simulation results.

As can be seen from FIGS. 7 and 8, when the number of times the obtained rotation angles are included is assigned to each angle range of 60°, the obtained rotation angles are dispersed to four angle ranges. With the angle ranges of 60°, there is no clear difference in the number of obtained rotation angles assigned to adjacent angle ranges. Therefore, it can be said that no maximum values appear in the angle ranges obtained by dividing 360° into six equal parts.

In contrast, when the number of times the obtained rotation angles are included is assigned to each angle range of 45°, a distinct maximum value (peak) appears in each of the range of 46° to 90° and the range of 226° to 270°. That is, the number of times the obtained rotation angles are included in the specific angle ranges is concentrated.

In the above example, maximum values appear in the angle ranges obtained by dividing 360° into eight equal parts, but the angle ranges in which maximum values appear can vary due to the combination of the obtained rotation angles and the angle ranges. In the example shown in FIG. 6, the obtained rotation angles concentrate at angles around 60° and angles around 240°. Then, when each angle range is set to 60°, the obtained rotation angles concentrated at angles around 60° are dispersed in the angle range of 1 to 60° and the angle range of 61° to 120°. For example, the number of times the obtained rotation angle is 60° and 56.25° is assigned to the angle range of 1° to 60°, while the number of times the obtained rotation angle is 63.75° is assigned to the angle range of 61° to 120°. The same holds true for the obtained rotation angles concentrated at angles around 240°. Accordingly, the difference in the number of times the obtained rotation angles are included in the adjacent angle ranges hardly is unlikely to appear.

On the other hand, if each angle range is 45°, the obtained rotation angles concentrated at angles around 60° will be included in the angle range of 46° to 90°. As a result, a maximum value appears in the angle ranges obtained by dividing 360° into eight equal parts. In the present embodiment, two maximum values appear in correspondence with two specific angles (the first angle and the second angle). In the present embodiment, the angle ranges in which the number of times the obtained rotation angle is included is a maximum value are the angle range in which the number of times the obtained rotation angle is included is the greatest and the angle range in which the number of times the obtained rotation angle is included is the second greatest.

The reception control section 51 calculates the reception-side angle difference, which is the difference between the median values of the angle ranges in which the number of times the obtained rotation angle is included is a maximum value. In the present embodiment, the reception-side angle difference is calculated to be 180°, which is the difference between 67.5°, which is the median value of the angle range of 46° to 90°, and 247.5°, which is the median value of the angle range of 226° to 270°. The median value is an angle at which the deviation angles from 46° and 226°, which are the minimum angles of each angle range, are equal to each other. It can also be said that the median values of the angle ranges are angles at which the deviation angles from the maximum angles of the angle ranges are equal to each other.

The reception control section 51 determines whether the reception-side angle difference matches the angle difference between the specific angles. Since 360° is divided into equal parts, the reception-side angle difference and the angle difference between the specific angles match each other for one of the four wheel assemblies 11. In the present embodiment, the angle difference between the specific angles is 180° and the reception-side angle difference is 180°. Thus, it can be determined that the transmitter 31 of the FRID is attached to the right front wheel assembly FR. The reception control section 51 stores in the transmission storage section 35b the FRIC and the right front wheel assembly FR in association with each other. The reception control section 51 performs similar processing for the FFID, RRID and RLID to associate the four ID codes with the four wheel assemblies 11, and ends the process. The reception control section 51 functions as an identifying section. That is, the identifying section is a part of the functions of the reception control section 51.

For the illustrative purposes, the rotation angle of the right front wheel assembly FR obtained upon reception of the transmission data transmitted from the transmitter 31 of the FRID has been described. However, as described above, the rotation angles of the other wheel assemblies 11 are also obtained. The obtained rotation angles of the wheel assemblies 11 other than those of the right front wheel assembly FR, which are obtained upon reception of the transmission data transmitted from the transmitter 31 of the FRID, are considered to have no maximum values even if the number of times included is assigned to each angle range. Even if a maximum value appears accidentally, the possibility that the same number of maximum values as those in the specific angles appears is slim, and the possibility that the angular difference between these maximum values and the angle difference between the specific angles may match is slimmer.

In the above description, various types of processes are performed by converting pulse count values to rotation angles. However, considering that the pulse count values indicate rotation angles, it is possible to perform processing using the pulse count values. For example, the possible rotation angles (360°) of the wheel assembly 11 correspond to ninety-six pulses. Thus, if the possible rotation angles of the wheel assembly 11 are divided into six equal parts, each angle range corresponds to sixteen pulses. Likewise, if the possible rotation angles of the wheel assembly 11 are divided into eight equal parts, each angle range corresponds to twelve pulses. The "rotation angle" is not limited to the rotation angle itself but may be any value that indicates a rotation angle.

The wheel assembly position identifying process of the present embodiment may be employed together with another wheel assembly position identifying process.

For example, a wheel assembly position identifying process that identifies the wheel assembly 11 to which each of the transmitters 31 is attached based on the variation of the obtained rotation angle may be executed in addition to the wheel assembly position identifying process of the present embodiment.

In this case, multiple wheel assembly position identifying processes may be executed in parallel, and the earlier determination result regarding the wheel assembly 11 to which each of the transmitters 31 is attached in the wheel assembly position identifying processes may be employed. Further, the wheel assembly 11 to which each of the transmitters 31 is attached may be identified based on the conformity between the determination results of the wheel assembly position identifying processes. For example, in a case in which the same determination result is obtained in multiple wheel assembly position identifying processes, the determination result thereof is employed, while in a case in which different determination results are obtained in the multiple wheel assembly position identifying processes, the wheel assembly position identifying processes may be executed again.

The operation and advantages of the receiver of the present embodiment will now be described.

(1-1) When the vehicle 10 is traveling on a bad road, the obtained rotation angle is more likely to be dispersed than in a case in which the vehicle 10 is traveling on a smooth road. In the example shown in FIG. 6, there is a high possibility that angles around 60° and rotation angles different from angles around 240° are obtained.

If the wheel assembly 11 to which each transmitter 31 is attached to is identified based on variation of the obtained rotation angles, the degree of variation is increased by an accidental transmission of transmission data at an angle that is significantly deviated from the specific angle. That is, if the wheel assembly 11 to which each transmitter 31 is attached to were to be identified based on variation of the obtained rotation angles, the transmission data transmitted at an angle significantly deviated from the specific angle would have a significant effect.

In contrast, in the present embodiment, the angle range larger than the resolution of the rotation sensor units 21 to 24 is set and the obtained rotation angles are aggregated in the specific angle range, whereby the difference in the number of times the obtained rotation angles are included is increased. The frequency at which the transmission data is accidentally transmitted at an angle significantly deviated from the specific angle is less than the frequency at which the transmission data is transmitted at an angle near the specific angle. Therefore, as compared with a specific angle range in which obtained rotation angles are aggregated, the number of times the obtained rotation angles are included in other angle ranges is small.

In addition, the reception control section 51 identifies the wheel assembly 11 to which each transmitter 31 is attached based on the angle difference between the specific angles and the reception-side angle difference, which is the difference between the median values of the angle ranges in which the number of times the obtained rotation angles are included is a maximum value. Since the reception-side angle difference can be calculated if a maximum value appears in the angle range, it is possible to identify the wheel assembly to which each transmitter 31 is attached even if the vehicle 10 is traveling on a bad road.

(1-2) The wheel assembly position identifying process is performed using multiple sets of angle ranges that are equally divided by different values. For this reason, even if a maximum value does not appear in one of the angle ranges, a maximum value appears in another angle range. Therefore, it is easy to identify the wheel assembly 11 to which each transmitter 31 is attached.

(1-3) It is also possible to individually identify the wheel assembly 11 to which each transmitter 31 is attached based on the obtained rotation angle obtained upon reception of the transmission data transmitted at the first angle and the obtained rotation angle obtained upon reception of the transmission data transmitted at the second angle. In this case, the obtained rotation angles need to be classified into ones obtained upon reception of the transmission data transmitted at the first angle and ones obtained upon reception of the transmission data transmitted at the second angle. If the receiver 50 recognizes that the transmission data is transmitted alternately at the first angle and the second angle, the obtained rotation angles may be classified alternately. Further, in some cases, the transmission data cannot be received due to the communication environment or the like, and therefore the transmission data transmitted at the first angle (or the second angle) is successively received. Even in this case, since the interval of transmission of the transmission data is recognized, it is possible to recognize that the transmission data transmitted at the same specific angle is received two consecutive times in a case in which the receiving interval of the transmission data is twice the transmitting interval of the transmission data.

However, in a case in which the transmission data cannot be received for several consecutive times, it is difficult to identify the wheel assembly 11 to which each of the transmitters 31 is attached. This is because it cannot be determined whether the transmission data, which is received after the transmission data cannot be received for several consecutive times due to the accuracy of the timing function of the reception control section 51 or the like, is transmitted at the first angle or the second angle. That is, the reception control section 51 cannot classify the obtained rotation angle into the obtained rotation angle obtained upon reception of the transmission data transmitted at the first angle and the obtained rotation angle obtained upon reception of the transmission data transmitted at the second angle.

It may be considered that angular data indicating the specific angle is included in the transmission data. However, in this case, the data length becomes long by the angular data. When the data length of the transmission data becomes long, the electric power consumption by transmitting the transmission data becomes large. In a case in which the angular data is made short (for example, 1 bit) in order to prevent the data length from being long, errors might not be detected although the angular data is incorrect. Consequently, the reception control section 51 may erroneously recognize that the transmission data transmitted at the second angle is received despite the fact that the transmission data transmitted at the first angle is received. This may slow down or prevents the identifying the wheel assembly 11 to which each of the transmitters 31 is attached.

In this regard, in the present embodiment, the wheel assembly position identifying process can be executed without classifying the obtained rotation angle into the obtained rotation angle obtained upon reception of the transmission data transmitted at the first angle and the obtained rotation angle obtained upon reception of the transmission data transmitted at the second angle. Accordingly, even in a case in which the transmission data cannot be received for several consecutive times, it is possible to identify the wheel assembly 11 to which each of the transmitters 31 is attached. Further, it is not necessary to include the angular data in the transmission data. Accordingly, the data length of the transmission data is shortened, and the electric power required for the transmitting is reduced. Further, since the angular data is not included in the transmission data, the identifying the wheel assembly 11 to which each of the transmitters 31 is attached will not be slowed down by the occurrence of errors in the angular data.

(1-4) The difference in the numbers of rotations (the rotation speeds) of the wheel assemblies 11 is large when the vehicle 10 turns, and small when the vehicle 10 is traveling straight. When identifying the wheel assembly to which each transmitter is attached based on the variation of the rotation angles of the wheel assemblies 11, the difference in the numbers of rotations of the wheel assemblies 11 is used. Thus, it is difficult to identify the wheel assembly 11 to which each transmitter 31 is attached when the vehicle 10 is traveling straight. In contrast, the wheel assembly position identifying process of the present embodiment is capable of identifying the wheel assembly 11 to which each transmitter 31 is attached even if the difference in numbers of rotations of the wheel assemblies 11 is slight. Therefore, even when the vehicle 10 is traveling straight, it is possible to identify the wheel assembly 11 to which each transmitter 31 is attached.

Second Embodiment

A receiver according to a second embodiment will now be described. In the following, description of the same parts as those of the first embodiment will be omitted or simplified.

Figure 9:
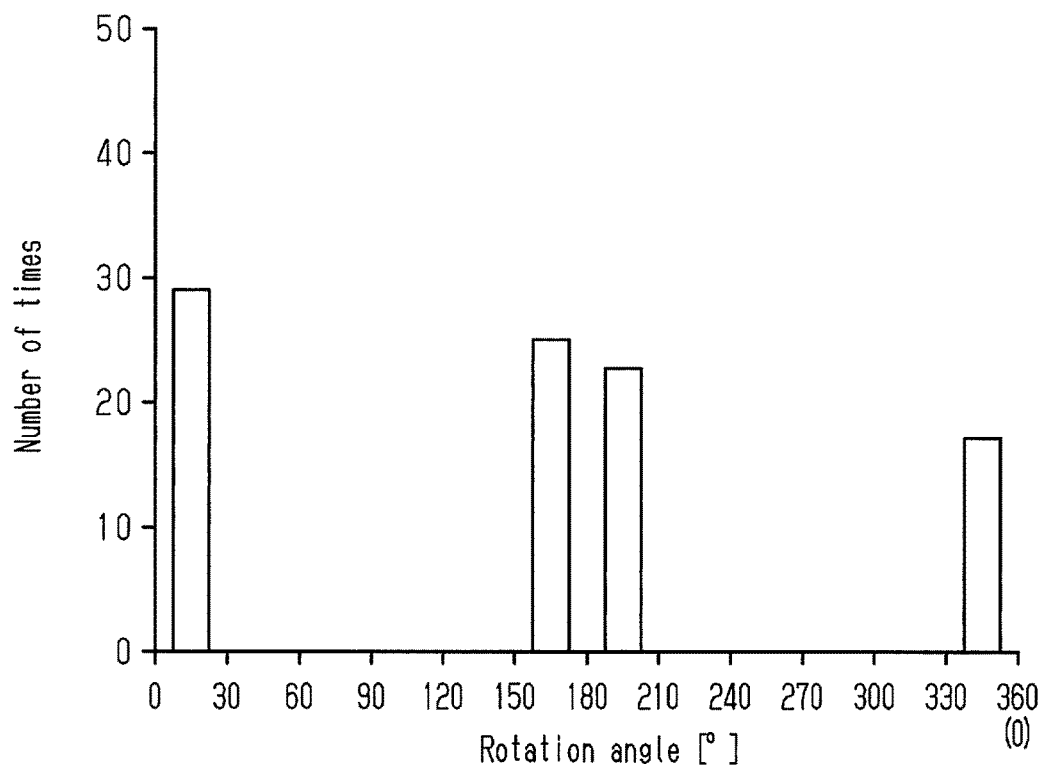
FIG. 9 is a diagram showing angle ranges obtained by dividing 360° into twelve equal parts and showing the angle ranges before the phase is changed.
Figure 10:
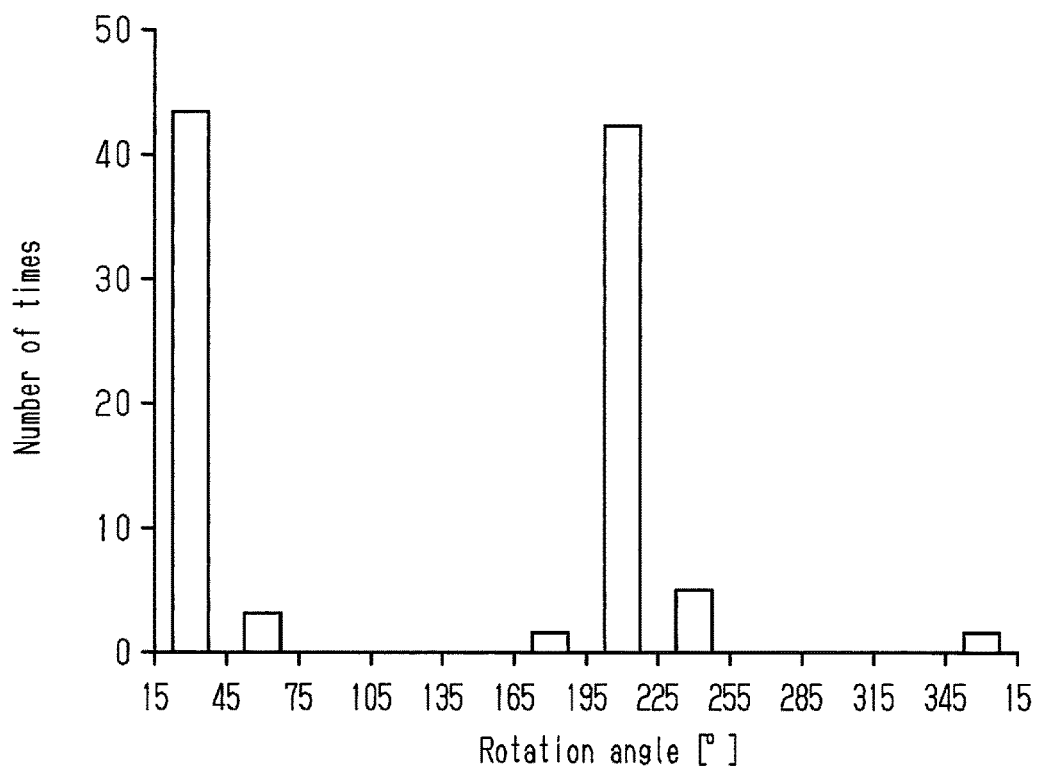
FIG. 10 is a diagram showing angle ranges obtained by dividing 360° into twelve equal parts and showing the angle ranges after the phase is changed.

As shown in FIGS. 9 and 10, the present embodiment uses angle ranges obtained by dividing 360° into twelve equal parts. That is, angle ranges of 30° intervals are set.

As in the first embodiment, the reception control section 51 assign each of the obtained rotation angles to one of the angle ranges. Furthermore, the reception control section 51 changes the phase of the angle ranges and assigns each of the obtained rotation angles to one of the angle ranges after changing the phase. In the present embodiment, the phase is shifted by 15° (4 pulses).

The reception control section 51 shifts the angle ranges by 15°, so that the angle range in which the minimum angle is 0°+30°×n (n=integer from 1 to 11) is changed to an angle range in which the minimum angle is 15°+30°×n (n=integer from 1 to 11). The obtained rotation angles included in the angle ranges before changing the phase and the angle ranges after changing the phase are different values.

It is now assumed that the first angle corresponds to 180° of the obtained rotation angle, and the second angle corresponds to 360° (0°) of the obtained rotation angle. In this case, the obtained rotation angles vary around 180° and 360°. That is, a distribution is obtained in which 60° in FIG. 6 is changed to 180° and 240° in FIG. 6 is changed to 360°.

As shown in FIG. 9, in the angle ranges before changing the phase, the obtained rotation angles are dispersed in the angle range of 150° to 179° and the angle range of 180° to 209°. Likewise, the obtained rotation angles around 360° will also be dispersed to two angle ranges.

In the angle ranges after changing the phase, most of the obtained rotation angles around 180° are included in the angle range of 195° to 224°. Likewise, the obtained rotation angles around 360° will concentrate in the angle range of 15° to 44°.

Therefore, in addition to the advantages (1-1), (1-3), and (1-4) of the first embodiment, the present embodiment achieves the following advantages.

(2-1) By changing the phase of the angle ranges, maximum values appear in the angle ranges after changing the phase even if no maximum values appear in the angle ranges before changing the phase. Therefore, it is easy to identify the wheel assembly 11 to which each transmitter 31 is attached.

(2-2) When changing the phase of the angle ranges, the minimum angle or the maximum angle of each angle range is different between the angle ranges before changing the phase and the angle ranges after changing the phase. In the present embodiment, the minimum angle of each angle range before changing the phase is 0°+30°×n, while each angle range after changing the phase is 15°+30°×n. Thus, it can be said that there is a difference of 15° in the minimum angle. One reason why no maximum values appear is that the angle difference between the obtained rotation angles corresponding to the first angle and the second angle and the minimum angle of the angle range is small, and the obtained rotation angles are dispersed in the two angle ranges. Differentiating the minimum angle of the angle ranges between before changing the phase and after changing the phase prevents a situation from occurring in which no maximum values appear either in the angle ranges before changing the phase and the angle ranges after changing the phase. Therefore, it is easy to identify the wheel assembly 11 to which each transmitter 31 is attached.

Third Embodiment

A transmitter unit and a receiver according to a third embodiment will now be described. In the following, description of the same parts as those of the first embodiment will be omitted or simplified.

Figures 11, 12:
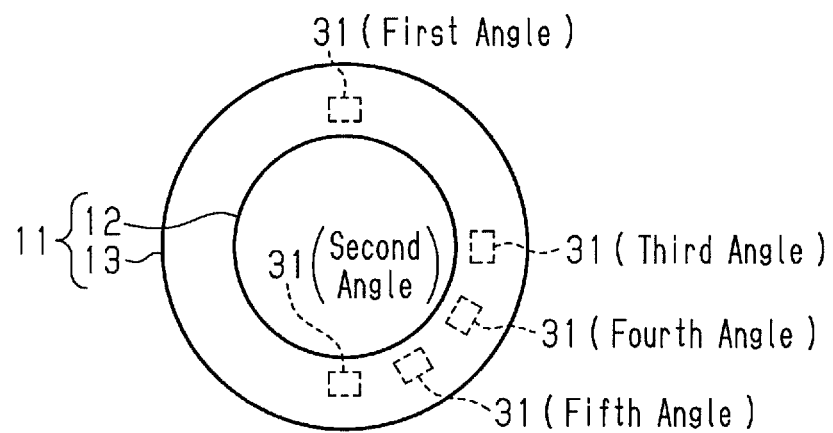
FIG. 11 is a diagram illustrating a specific angle at which the transmitter transmits transmission data.
FIG. 12 is a diagram showing a correspondence relationship between the last digits of the ID codes and the specific angles.

As shown in FIG. 11, similarly to the first embodiment, the angle at which the transmitter 31 is located at the uppermost position is defined as a first angle, and the angle at which the transmitter 31 is located at the lowermost position is defined as a second angle. The first angle is shifted from the second angle by 180°. The angle at which the transmitter 31 is located at a position shifted from the position of the first angle by 90° is defined as a third angle. The angle at which the transmitter 31 is located at a position shifted from the position of the first angle by 120° is defined as a fourth angle. The angle at which the transmitter 31 is located at a position shifted from the position of the first angle by 150° is defined as a fifth angle.

The transmitters 31 are grouped to correspond to the last digit of the ID codes when the ID codes are shown as hexadecimal numbers. Since the number of wheel assemblies 11 is four, the ID codes are grouped into four groups. The number of the groups may be changed in accordance with the number of the wheel assemblies 11.

Of the last digits of the ID codes represented as hexadecimal numbers, the first group is defined by the ID codes each including the last digit of 0 to 3, the second group is defined by the ID codes each including the last digit of 4 to 7, the third group is defined by the ID codes each including the last digit of 8 to B, and the fourth group is defined by the ID codes each including the last digit of C to F.

As shown in FIG. 12, in the transmitter 31 of the first group, the first angle and the second angle are defined as specific angles. In the transmitter 31 of the second group, the first angle and the third angle are defined as specific angles. In the transmitter 31 of the third group, the first angle and the fourth angle are defined as specific angles. In the transmitter 31 of the fourth group, the first angle and the fifth angle are defined as specific angles. That is, the angle difference between the specific angles varies in accordance with the specific angles.

The transmitter unit U includes one transmitter 31 of each of the groups. With this, each of the transmitters 31 of the transmitter unit U has the angle difference between the specific angles, and the angle difference between the different specific angles varies among the transmitters 31.

The reception storage section 55 stores the angle difference between the specific angles in association with the last digits (the groups) of the ID codes. Thus, the reception control section 51 is capable of acquiring, based on the ID code included in the transmission data, the angle difference between the specific angles of the transmitter 31 that has transmitted the transmission data.

Figure 13:
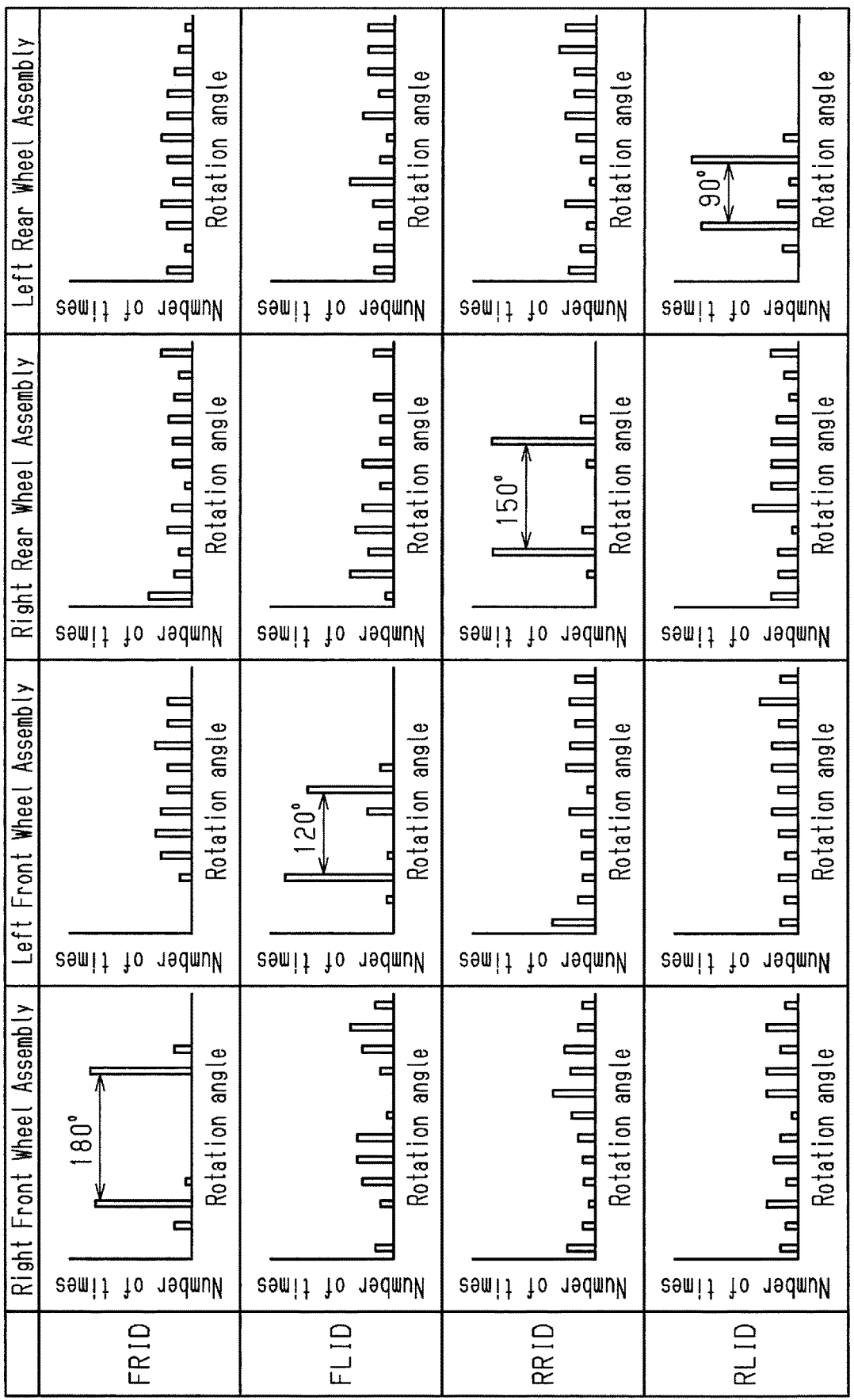
FIG. 13 is a diagram showing a correspondence relationship between the last digits of the ID codes and the obtained rotation angles of the wheel assemblies.

As in the first embodiment, the reception control section 51 assigns each of the obtained rotation angles to one of the angle ranges as shown in FIG. 13. In the example of FIG. 13, each of the obtained rotation angles is assigned to one of 30° angle ranges obtained by dividing 360° into twelve equal parts.

As can be seen from FIG. 13, there is one wheel assembly 11 in which the reception-side angle difference and the angle difference between the specific angles coincide with each other for each transmitter 31. As in the first embodiment, the reception control section 51 associates the ID code with the wheel assembly 11 based on the correspondence between the reception-side angle difference and the angle difference between the specific angles.

Since the angle difference between the specific angles varies among the transmitters 31, checking whether the reception-side angle difference and the angle difference between the specific angles allows for checking whether the transmission data is transmitted at the specific angle matched with the ID code of the transmitter 31. For example, it is assumed that the transmitter 31 of the FRID is used as the transmitter 31 of the first group, and the angle difference between the median values of the angle ranges in which the number of times the rotation angles obtained upon reception of the transmission data transmitted from the transmitter 31 of the FRID is 120°. This prevents determination that the transmitter 31 of the FRID is attached to the wheel assembly 11 corresponding to the rotation sensor unit that has detected the reception-side angle difference of 120°. In this case, another execution of the wheel assembly position identifying process allows for identification of the wheel assembly 11 to which each of the transmitters 31 is attached.

Therefore, in addition to the advantages (1-1) to (1-4) of the first embodiment, the third embodiment achieves the following advantages.

(3-1) The reception storage section 55 stores the ID code and the angle difference between the specific angles in association with each other. Thus, even if the angle difference between the specific angles varies among the transmitters 31, it is possible to identify the wheel assembly 11 to which each of the transmitters 31 is attached. Further, since whether the transmission data is transmitted at the specific angle matched with the ID code (the transmitter 31) is checked, the reliability of the identification of the wheel assembly 11 to which each of the transmitters 31 is attached is improved.

(3-2) Each of the transmitters 31 of the transmitter unit U transmits the transmission data when any of multiple specific angles is detected. Thus, the receiver 50 is allowed to identify the wheel assembly 11 to which each of the transmitters 31 is attached based on the angle difference between specific angles. Further, each of the transmitters 31 has the angle difference between the different specific angles, and the angle difference between the different specific angles varies among the transmitters 31. Thus, each of the transmitters 31 can cause the receiver 50 to check whether the transmission data is transmitted at the specific angle matched with the ID code (the transmitter 31). This improves the reliability of the identification of the wheel assembly 11 to which each of the transmitters 31 is attached.

The above-described embodiments may be modified as follows.

In each embodiment, one set of angle ranges obtained by dividing 360° into equal parts may be used as the angle ranges. For example, in the first embodiment, the wheel assembly position identifying process may be performed only with a set of 45° angle ranges obtained by dividing 360° into eight equal parts. In this case, another wheel assembly position identifying process is also used, so that it is possible to identify the wheel assembly 11 to which each transmitter 31 is attached by any one of the multiple wheel assembly position identifying processes.

In the first embodiment, when the angle differences between the specific angles are the same angle (180° interval in the first embodiment), the following process may be used as one of multiple wheel assembly position identifying processes.

When obtaining obtained rotation angles, the reception control section 51 sets, as a corrected rotation angle, a value (rotation angle) obtained by modulo operation of the obtained rotation angles with the angle difference (180°) between the specific angles. The corrected rotation angles can be regarded as the rotation angles obtained upon reception of the transmission data transmitted at a certain angle. The reception control section 51 assigns each of the corrected rotation angles to one of the angle ranges that are obtained by equally dividing 360°, which corresponds to the possible rotation angles of the wheel assembly 11. Then, for one of the four wheel assemblies 11, an angle range appears in which the number of times the corrected rotation angles are included becomes a maximum value. It is possible to identify that the transmitter 31 that has transmitted the transmission data is attached to the wheel assembly 11 in which this maximum value appeared.

The calculation for obtaining corrected rotation angles is not limited to the modulo operation. For example, 180° may be subtracted if the obtained rotation angle is larger than 180°, or 180° may be added if the obtained rotation angle is less than 180°. That is, as long as transmission data can be regarded as being transmitted at the same angle, any calculation method may be used.

In each embodiment, the number of the specific angles may be set to three or more. In this case, the divisor and the like are changed in accordance with the specific angles such that, when the obtained angles are assigned to the angle ranges, the same number of maximum values as the specific angles appears.

In each embodiment, instead of the median values, the reception-side angle difference may be obtained based on the difference between the minimum angles of the angle ranges, the difference between the maximum angles of the angle ranges, the difference between the angles obtained by adding a predetermined angle to the minimum angles of the angle ranges.

In each embodiment, the wheel assembly position identifying process may be performed by using three or more sets of angle ranges in which 360° is divided into different numbers of equal parts.

In each embodiment, when performing the wheel assembly position identifying process by using multiple sets of angle ranges in which 360° is divided into different numbers of equal parts, it is possible to identify the wheel assembly 11 to which each transmitter 31 is attached by various methods. In the first embodiment, maximum values appear in the angle ranges obtained by dividing 360° into eight equal parts, and no maximum values appear in the angle ranges obtained by dividing 360° into six equal parts. Thus, the wheel assembly 11 to which each transmitter 31 is attached is identified from a set of the angle ranges obtained by dividing 360° into eight equal parts. When a maximum value appears in each of the angle ranges, the wheel assembly 11 to which each transmitter 31 is attached may be identified on the condition that the positions of the wheel assemblies 11 identified by the respective angle ranges coincide with each other. In addition, the wheel assembly 11 in which no maximum values appear in any of the angle ranges may be excluded from the candidates of the wheel assemblies 11 to which each transmitter 31 is attached. This allows the wheel assembly 11 to which each transmitter 31 is attached to be identified through a process of elimination.

In each embodiment, the angle difference between the specific angles may be changed as necessary.

In each embodiment, the transmission data does not necessarily need to be transmitted alternately at the first angle and the second angle. For example, the transmission data may be transmitted at the first angle and the second angle at random. Alternatively, the transmission data may be transmitted at the first angle or the second angle consecutively until switched to the other.

In each embodiment, the reception storage section 55 may store the ID codes of the transmitters 31 attached to the wheel assemblies 11 and the ID code of the transmitter 31 attached to the spare tire. Further, the reception storage section 55 may store both of the ID codes of the transmitters 31 attached to summer tires and the ID code of the transmitters 31 attached to winter tires.

In each embodiment, the vehicle 10 only has to include multiple wheel assemblies 11, and for example, the vehicle 10 may be a motorcycle.

In each embodiment, the number of the teeth of the gear 26 of the vehicle 10 may be set to any number. That is, the resolution of the rotation angle detecting section may be different from that in each embodiment.

The wheel assembly position identifying process of the first embodiment may be employed together with the wheel assembly position identifying process of the second embodiment. For example, the reception control section 51 may assign the obtained rotation angles to multiple sets of angle ranges that are obtained by dividing 360° into different numbers of equal parts. Then, for each set of the angle ranges, the obtained rotation angles may be assigned to angle ranges of which the phase has been changed.

In the third embodiment, the angle difference between the specific angles is changed in accordance with the last digit of the ID code. However, the present disclosure is not limited to this. The last digit of the ID code may be set to the same number or character as long as the angle difference between specific angles varies among the transmitters 31 of the transmitter unit U. Further, the reception storage section 55 only needs to store the ID code of the transmitter 31 associated with the receiver 50 and the angle difference between the specific angles of the transmitter 31.

In the third embodiment, the number of the specific angles may be different between the groups.

In the third embodiment, the grouping may be implemented by using the value of a specific bit instead of the last digit of the ID code.

DESCRIPTION OF THE REFERENCE NUMERALS

U . . . Transmitting Unit; 10 . . . Vehicle; 11 . . . Wheel Assembly; 21 to 24 . . . Rotation Sensor Unit; 25 . . . ABS Controller; 30 . . . Tire Condition Monitoring Apparatus; 31 . . . Transmitter; 34 . . . Acceleration Sensor (Specific Angle Detecting Section); 35*b* . . . Transmission Storage section; 36 ... Transmission Circuit (Transmission section); 50 ... Receiver; 51 ... Reception Control section (Obtaining Section, Acquiring Section, and Identifying Section); 52 ... Reception Circuit (Receiving section); 55 ... Reception Storage Section.

The invention claimed is:

1. A receiver configured to be mounted on a vehicle having rotation angle detecting sections each of which detects rotation angles of one of wheel assemblies, wherein a transmitter is attached to each wheel assembly, the receiver being configured to identify the wheel assembly to which each transmitter is attached, the receiver comprising:

a receiving section configured to receive transmission data that is transmitted from each transmitter when the transmitter detects that the associated wheel assembly is at any of specific angles set in possible rotation angles of the wheel assembly;

an obtaining section configured to obtain the rotation angles from the rotation angle detecting section upon reception of the transmission data by the receiving section;

an acquiring section configured to assign each of the rotation angles obtained by the obtaining section to one of angle ranges that are obtained by dividing possible rotation angles of the wheel assembly into equal parts, and to acquire a number of times the rotation angles obtained by the obtaining section are included in each angle range; and an identifying section configured to associate ID codes included in the transmission data with the wheel assemblies based on whether, in the angle ranges in which the number of times acquired by the acquiring section are maximum values, an angle difference between the specific angles matches a reception-side angle difference, which is an angle difference between the rotation angles at which deviation angles from minimum angles in the angle ranges are equal to each other.

2. The receiver according to claim 1, wherein the angle ranges are in one of a plurality of sets of angle ranges that are obtained by dividing possible rotation angles of the wheel assembly into different numbers of equal parts, and the acquiring section is configured to acquire a number of times the rotation angles obtained by the obtaining section are included in each of the angle ranges.

3. The receiver according to claim 1, wherein the acquiring section is configured to acquire a number of times the rotation angles obtained by the obtaining section are included in each of the angle ranges, and change a phase of the angle ranges and acquire a number of times the rotation angles obtained by the obtaining section are included in each of the angle ranges the phase which has been changed.

4. The receiver according to claim 1, wherein the angle difference between the specific angles varies among the transmitters attached to the wheel assemblies, and the receiver comprises a reception storage section, which stores the ID codes of the transmitters and the angle difference between the specific angles in association with each other.

5. A transmitter unit comprising a plurality of transmitters, each of which is configured to be attached to one of wheel assemblies of a vehicle each having a rotation angle detecting section that detects rotation angles of the associated wheel assembly and transmits transmission data to a receiver mounted on the vehicle, wherein the receiver is configured to assign each of the rotation angles obtained from the rotation angle detecting sections upon reception of the transmission data to one of angle ranges that are obtained by dividing possible rotation angles of the wheel assembly into equal parts, acquire a number of times the rotation angles obtained from the rotation angle detecting sections are included in each of the angle ranges, and identify the wheel assembly to which each transmitter is attached based on the angle range in which the number of times is a maximum value, each transmitter includes a transmission storage section in which an individual ID code is stored, a specific angle detecting section configured to detect that the wheel assembly is at any of specific angles set in possible rotation angles of the wheel assembly, and a transmission section configured to transmit the transmission data including the ID code when it is detected that the rotation angle of the wheel assembly matches one of the specific angles, thereby causing the receiver to identify the wheel assembly to which each transmitter is attached, and the angle difference between the specific angles varies among the transmitters.

* * * * *